UNITED STATES PATENT OFFICE.

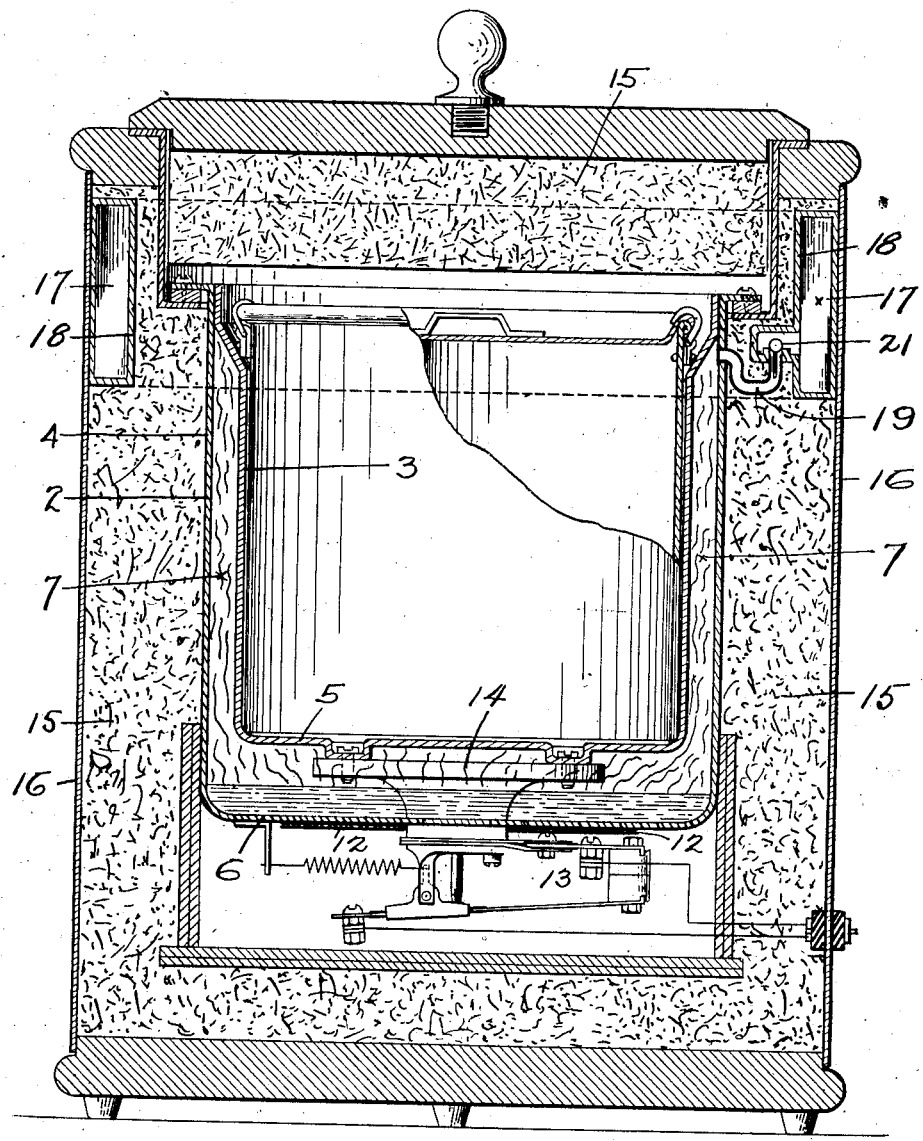

ARTHUR J. KERCHER, OF BERKELEY, CALIFORNIA, ASSIGNOR TO BERKELEY ELECTRIC COOKER COMPANY, OF BERKELEY, CALIFORNIA, A CORPORATION OF CALIFORNIA.

ELECTRICALLY-HEATED COOKER.

1,151,189.   Specification of Letters Patent.   Patented Aug. 24, 1915.

Application filed December 14, 1912. Serial No. 736,830.

*To all whom it may concern:*

Be it known that I, ARTHUR J. KERCHER, a citizen of the United States, and a resident of Berkeley, county of Alameda, and State of California, have invented certain new and useful Improvements in Electrically-Heated Cookers, of which the following is a specification.

The invention relates to cookers which are adapted to be heated to the proper temperature by means of an electric current, and more particularly to cookers in which the substance or substances to be cooked and the heating units are entirely inclosed by a heat insulating material so that all of the heat generated by the heating element is utilized in cooking the substance.

The object of the invention is to provide a cooker in which the heat is transferred to all parts of the exterior of the cooking vessel by steam.

Another object of the invention is to provide a double walled receptacle surrounding the cooking receptacle with means for reducing the pressure therein as it is increased due to an increase in temperature.

A further object of the invention is to provide an electrically heated cooker in which the electric current is controlled to maintain a substantially constant temperature within the cooker.

The device possesses other advantageous features, which, with the foregoing, will be set forth at length in the following description where I shall outline in full that form of the invention which I have selected for illustration in the drawing accompanying and forming part of the present description. The novelty of the invention will be included in the claims succeeding said description. From this it will be apparent that I do not limit myself to the showing made by such drawing and description, as I may adopt many variations within the scope of my invention as expressed in said claims.

The figure is a vertical section of the cooker showing the improvements of my invention.

The heating element is adapted to heat a body of liquid in a closed receptacle from which the heat is transferred to the substance to be cooked, and the regulating and controlling means is arranged to be operated by the change in pressure within the receptacle, caused by a change in temperature. At a given temperature a certain pressure is reached and the controlling mechanism is arranged to open the circuit when such temperature is exceeded, and to close the circuit when the temperature drops below this point. By this means the substance to be cooked is subjected to a substantially constant temperature and is cooked to better advantage than in instances where the temperature varies in any substantial degree.

The cooker consists of a receptacle 2 having double side walls 3—4 and double bottom walls 5—6 spaced apart to form a chamber 7 therebetween. The joint between the side walls 3—4 at their upper ends is preferably formed by alloying or fusing the two walls together.

A quantity of water or other liquid is placed in the chamber 7 so that it completely covers the bottom thereof and the chamber is them sealed, the pressure therein being substantially atmospheric pressure.

The heating units 12 of any desired construction are arranged on the bottom 6 of the receptacle 2, and are insulated therefrom by a thin strip of suitable insulating and heat resisting material such as mica.

Below the receptacle 2 is a quick throw switch 13 which is operated by a buckling diaphragm arranged in the casing 14 which occurs within the chamber 7. The upper face of the diaphragm is exposed to the pressure within the chamber 7 and the lower face is exposed to atmospheric pressure. An increase in pressure in the chamber to a certain point causes the diaphragm to spring downward and open the switch, and a lowering of the temperature below such point allows the diaphragm to spring back, allowing the switch to close.

The closed receptacle and the heating units are surrounded by a casing 15 of heat insulating material which is preferably inclosed in a sheet metal case 16.

It is evident that if the chamber 7, which contains air and water, were heated, the pressure therein, due to the expansion of the air, would increase to quite a high degree before the temperature reached the cooking point. In devices of this nature it is not advisable to produce a very high pressure and the diaphragm is arranged to operate with an increase of a few pounds above atmosphere, and when such pressure is reached the temperature of the cooker is approximately 212° Fahrenheit.

In order to obviate high pressures and to obtain the removal of the air (which is a poor conductor of heat) from the chamber 7, I have provided a second chamber 17 into which the air is forced as the pressure within the chamber 7 increases. The chamber 17 occurs within the annular casing 18 which is arranged adjacent the sheet metal casing 16, and which is sealed, with the exception of an aperture into which a conductor 19 connecting the chambers 7 and 17 extends. The conductor 19 is connected to the chamber 7 adjacent the upper portion thereof so that substantially all of the expanded air may pass into chamber 17. A ball valve 21, provided with means for preventing its displacement, controls the entrance of the pipe 19 into the chamber 17, so that there may not be any rapid circulation of the air back to the chamber 7.

The casing 18 is preferably arranged in contact with the sheet metal casing 16, so that the heat of the air therein is rapidly radiated, thereby reducing the pressure in the chamber 17, and the size of the chamber 17 is such that the air from chamber 7 can be forced thereinto without objectionably increasing the pressure therein. In the drawing the size of chamber 7 is exaggerated in proportion to the size of chamber 17. When the current has been shut off and the temperature and pressure in chamber 7 is lowered, the air from chamber 17 will gradually leak past the ball valve 21 until the pressures in the two chambers are again in equilibrium.

By the use of this invention an efficient and even transference of the heat from the heating units to all parts of the cooking vessel is obtained and a cooking temperature is obtained without the production of any objectionably high pressures.

I claim:

1. In a cooker, a double-walled receptacle adapted to contain the food to be cooked, the chamber between the walls being closed and being partly filled with liquid which vaporizes and permeates the chamber when heated, a closed casing spaced from said receptacle and a conduit connecting the chamber with the casing through which the air from the chamber passes into the casing when the receptacle is heated.

2. In a cooker, a closed receptacle adapted to contain a quantity of liquid, a closed expansion chamber arranged above the level of the liquid and spaced from said receptacle, a conduit connecting said receptacle and chamber and a valve in said conduit.

3. In a cooker, a closed receptacle adapted to contain a quantity of liquid and air, a closed casing spaced from said receptacle, a conduit connecting said receptacle above the level of the liquid therein with said casing through which air passes from the receptacle to the casing when the receptacle is heated, and a check valve in said conduit.

4. In a cooker, a double walled receptacle adapted to contain the food to be cooked, the chamber between the walls being closed and containing air and a small amount of liquid, which liquid is adapted to be vaporized by the application of heat, a casing of heat insulating material surrounding said receptacle, a closed casing arranged in thermal contact with the atmosphere and a conductor connecting said casing with said receptacle through which the air in said receptacle passes to the casing when the receptacle is heated.

5. In a cooker, a closed receptacle partly filled with liquid, a casing of heat insulating material surrounding said receptacle, a closed expansion chamber in thermal communication with the atmosphere, a conduit connecting said closed chamber and receptacle, and a valve in said conduit.

6. In a cooker, a heat insulated closed receptacle partly filled with water and adapted to surround the food to be cooked, and an expansion chamber arranged to radiate its heat into the atmosphere, spaced apart from said receptacle, but in communication therewith.

In testimony whereof, I have hereunto set my hand at Berkeley, California, this 6th day of December 1912.

ARTHUR J. KERCHER.

In presence of—
 L. D. WATERMAN,
 M. D. SNELL.